J. P. HEENEY.
COMBINED TRAP, WASTE, AND OVERFLOW.
APPLICATION FILED JUNE 27, 1907.
903,569.
Patented Nov. 10, 1908.
2 SHEETS—SHEET 1.
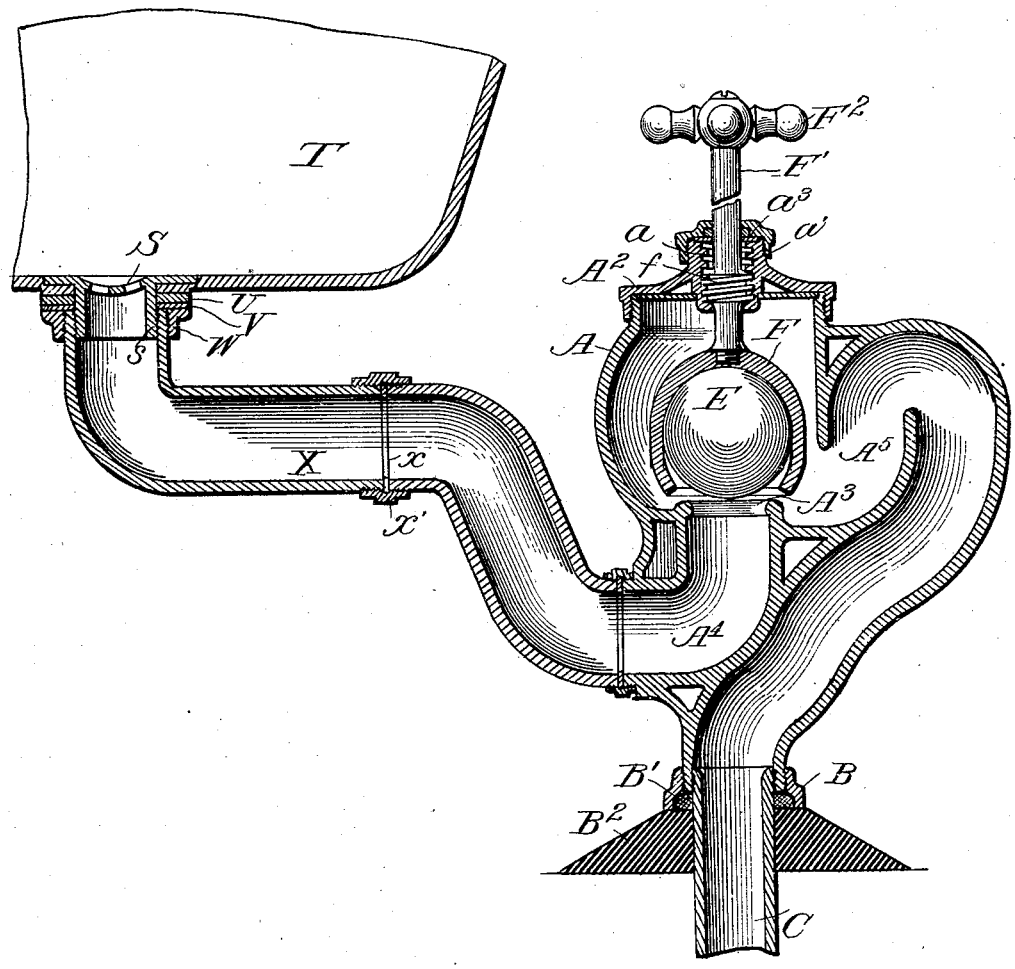

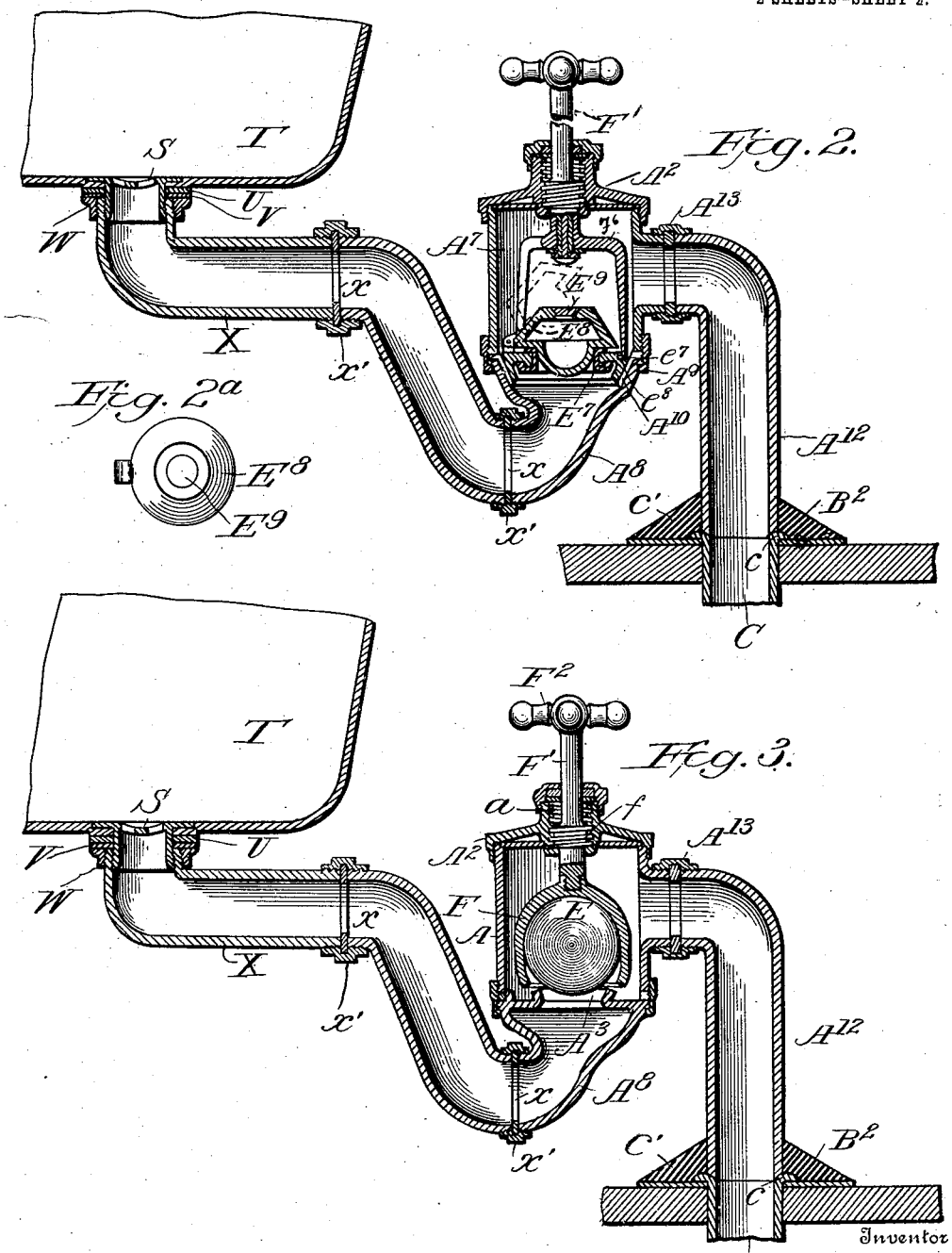

UNITED STATES PATENT OFFICE.

JOSEPH P. HEENEY, OF EAST ST. LOUIS, ILLINOIS.

COMBINED TRAP, WASTE, AND OVERFLOW.

No. 903,569.  Specification of Letters Patent.  Patented Nov. 10, 1908.

Application filed June 27, 1907. Serial No. 381,082.

*To all whom it may concern:*

Be it known that I, JOSEPH P. HEENEY, a citizen of the United States, residing at East St. Louis, in the county of St. Clair and State of Illinois, have invented certain new and useful Improvements in a Combined Trap, Waste, and Overflow, of which the following is a specification.

My invention relates to that class of basin and tub fittings comprising a combined trap, waste and overflow valve.

The main object of the invention is to provide a simple and effective trap, waste and overflow in which the valve cannot be held permanently locked to its seat. This object I accomplish by means of the construction shown in the accompanying drawings, in which Figure 1 is a vertical sectional view of one form of my trap, waste and overflow valve. Fig. 2 is a similar view of another form thereof. Fig. 2ª is a detail plan of the valve proper of Fig. 2. Fig. 3 is a view similar to Fig. 1 of a third form of my improved trap, waste and overflow valve.

A designates the valve casing in the form of a liquid seal trap and comprising a valve chamber A′ having a top A² secured thereon, while in the bottom of the chamber is formed the valve seat A³ up to which leads the elbow shaped inlet A⁴.

Above the valve seat in the opposite side of the valve chamber from the inlet A⁴ is the outlet passage A⁵ which extends upwardly to form a trap above the valve seat and thence downwardly and inwardly into the plane of the valve chamber where it is threaded to receive the lock nut or coupler B of the waste pipe C. B′ is a rubber washer in lower end of nut or coupling B and B² is a wiped flange at the floor line. E is a weighted valve in the form of a ball and made of lead or other suitable metal. This valve is made sufficiently heavy to remain seated until the water in the tub or other fixture reaches the desired height for washing or other purposes and so retain the water therein. Should the faucet be left turned on, however, the increased weight of water will lift the valve as shown in the drawing and thus establish an overflow. The usual overflow passage which is so objectionable is thus done away with. As soon as the normal height of water in the tub, basin, &c., is reached the ball will drop and retain the normal amount of water. The shape of the casing causes a liquid seal trap to be formed at all times against the entrance therethrough of sewer gas, and the valve E also serves at times as a valve for this purpose.

In order that the water may be discharged from the tub, basin or the like, I provide a cage or pronged lifter F in which the ball is free to rise and fall, but which will lift the ball from its seat when raised by its operating rod F′. This operating rod has a handle F² at its upper end which is within reach of the operator at the upper edge of the tub, basin and the like and the rod is secured at its lower end to the valve ball cage F. Above the sage F the rod F′ has coarse threads $f$, which engage internal threads $a$, in a chamber $a′$ formed in the top or cover A². This chamber $a′$ is closed by a cap $a²$ and suitable washers or packing $a^3$ so as to prevent leakage. The rod F′ cannot be screwed down far enough to hold the ball or valve E to its seat, as its threaded portion will strike the bottom of chamber $a′$ so that there is no way of leaving the ball or valve locked down and thus causing an overflow. When it is desired to discharge the normal contents of the fixture T, which may, as before stated, be a tub, basin or other receptacle, the handle F² is turned so as to cause the rod F′ to rise and lift the cage or valve lifter F, which in turn will lift the valve E from its seat, whereupon the water will rapidly discharge through the casing.

The inlet side of the casing will be connected in any desired manner to the bottom of the fixture T, for instance, by a pipe X, washer $x$, lock nut or coupling $x′$ and the other end of pipe X is internally and externally threaded to receive the threaded collar $s$ of the strainer S and the lock nut or coupling W between which and the tub or fixture are the washers U, V.

The parts are all accessible for cleaning, repair, &c.

In Fig. 2 the valve casing comprises a valve chamber A⁷ in the form of a cylinder threaded at its upper and lower ends to receive the top or cover A², which is the same as in Fig. 1, and the removable elbow-shaped, trap-forming bottom piece A⁸ clamped to the lower end of the valve casing by a lock nut or coupling A⁹. Within the conical upper end of this bottom piece A⁸ is the flanged conical washer A¹⁰ on which rests the valve seat E⁷ to which is pivoted the vertically swinging valve E⁸. This valve E⁸ is made hollow and closed by a plug or other closure E⁹ so as to receive material to give it the required weight to lift at any desired water pressure. Both forms of valves E, E⁸ have, therefore, means for holding them down on the seat until a certain amount of water has accumulated in the tub or receptacle T and also means for preventing their being locked down on their seats. The cage or lifter F⁶ is connected to the valve seat E⁷ at the lower ends of its prongs by lateral bends e⁷ entering notches e⁸ in the seat. The cage or lifter F⁶, has sufficient height above the valve to allow it to rise when the cage is forced down to its lowest position so that this construction broadly speaking includes means for preventing the valve from being locked down on its seat and this is true also of the ball valves E both of which are free to move upwardly in their cages or lifters when the latter are forced down to their lowest positions. The rod lifts the valve seat and valve as an entirety when the contents of the fixture T are to be discharged and so the valve has a free independent movement that cannot be interfered with. See the dotted lines which show the valve permitting an overflow, while the full lines show the valve acting to retain the water in the tub or receptacle. The discharge passage from the casing is not integral as in Fig. 1 but consists of a separate pipe A¹² coupled at its upper end to a lateral nipple A¹³ at the outlet side of the casing and at its lower end connected to the waste pipe C.

In Fig. 3 the same construction is found as in Fig. 2 except that the ball valve E and the lifter F of Fig. 1 are employed and the integral valve seat A³ is also employed as in Fig. 1 instead of the vertically movable valve seat of Fig. 2. In all of the figures the trap-like valve casing is present, forming a water seal against the ingress of gas, and the valve also assists in preventing the passage of gas when on its seat in addition to its functions of holding a normal amount of water in the tub or other receptacle, rising automatically to prevent an overflow when this normal amount is exceeded, and of being manually raised to empty the contents of the tub &c.

In Figs. 2 and 3 the wiped joint B² on the waste pipe C is at the junction of the lower beveled end of the pipe A¹² and upper flanged end c of the waste pipe which overlies a washer c' resting on the floor. In Figs. 2 and 3 the horizontal inlet pipe X is in line with the outlet A³ so that no water will remain in pipe X when the valve is manually raised to let the water out.

What I claim is:—

1. A combined trap, waste and overflow comprising a trap-forming casing having a removable top provided with an internally threaded chamber, and a horizontally disposed valve seat within the casing said casing having an inlet below the valve seat and an outlet thereabove, of an upwardly opening valve adapted to be held on the seat against a normal pressure of water, and having free upward movement to permit an overflow upon an abnormal water pressure against its under side, a lifter or cage in which the valve has free upward movement and constructed to prevent the valve from being locked down on its seat, and a manually operated rod secured at its lower end to the cage and having threads thereabove in engagement with those in the said top.

2. A combined trap, waste and overflow comprising a casing, a valve seat therein, a weighted valve adapted to open automatically upon an abnormal pressure and remain closed under a normal pressure, a cage in which the valve has free independent movement, a manually operated rod having a threaded engagement with the top of the casing, and connected at its lower end to the said cage to lift the valve.

3. A combined trap, waste and overflow comprising a trap-like casing having a valve seat, a weighted valve thereon adapted to open automatically upon an abnormal pressure and remain closed under a normal pressure and a lifting mechanism comprising, a cage or lifter in which the valve has free upward movement, a manually operated rod having a threaded engagement with the casing top, and connected at its lower end to the cage or lifter said lifting mechanism being adapted to prevent locking of the valve to its seat.

4. A combined trap, waste and overflow comprising a casing, a vertically movable valve seat therein, a weighted valve closing down on the seat, a cage or lifter connected to the seat and in which the valve has free and independent upward movement, and a manually controlled rod extending down through the casing top and connected to said cage or lifter to lift the valve and its seat.

5. A combined trap, waste and overflow comprising a casing, a vertically movable valve seat therein, a valve pivoted thereto to swing upwardly and manually controlled means for lifting the seat and its attached valve.

6. A combined trap, valve and overflow comprising a casing, a vertically movable valve seat therein, a hollow weight receiving valve pivoted to the seat, and means for lifting the seat and its attached valve.

7. A combined trap, waste and overflow comprising, a trap forming casing having a valve seat, a valve thereon adapted to open automatically upon an abnormal pressure and held to its seat against a predetermined weight of water, and a valve lifting mechanism including a manually operated stem extending up through the top of the casing; said lifting mechanism being adapted to prevent the valve from being locked to its seat.

8. A combined trap, valve and overflow comprising a cylindrical casing, a screw cap closing the top of the casing, an inlet trap forming pipe having a conical cap coupled to the lower end of the casing, a conical washer held in place by said conical cap, a conical valve seat resting on the conical washer, a valve carried by the seat and having independent movement, a rod for lifting the seat and its attached valve, and an outlet pipe coupled to one side of the casing.

9. A combined trap, waste and overflow comprising a cylindrical casing having a removable cover, a removable trap forming elbow coupled to the lower open end of the casing, a horizontal inlet pipe coupled to the inlet end of said elbow, an outlet from the casing in line with said horizontal pipe, a horizontal valve seat in the casing, an upwardly opening valve adapted to be held down on the seat until an abnormal pressure is reached, and a lifting mechanism comprising a threaded lifting rod extending down through the top of the casing, and a cage on the lower end of the rod and in which the valve has free upward movement said lifting mechanism being adapted to prevent the locking of the valve to its seat.

In testimony whereof I affix my signature, in presence of two witnesses.

JOSEPH P. HEENEY.

Witnesses:
    GEO. D. PFEIFFENBERGER,
    GERTRUDE WAGNER.